INVENTOR.
WADSWORTH W. MOUNT
BY
ATTORNEY

United States Patent Office 3,326,006
Patented June 20, 1967

3,326,006
PILE SHELLS AND COUPLINGS
Wadsworth W. Mount, Warren Township, Somerset County, N.J., assignor to Tecon Corporation, Dallas, Tex., a corporation of Delaware
Filed May 1, 1964, Ser. No. 365,565
18 Claims. (Cl. 61—53)

This invention pertains to cores and shells used for the production of shell-type, cast-in-place concrete piles, and one object is to provide a coupling ring mechanism for shell intersections which is particularly adapted for use in the forming and driving of pile shells where the length of the pile makes it essential, or at least highly desirable, to use a plurality of sections. The sections are preferably of different sizes stepped down, with the largest at the top.

This application is a continuation-in-part of my copending application Ser. No. 324,030, filed Nov. 15, 1963 and now abandoned, for Groove-Lock Pile Pipe Connections.

Another object of this invention is to provide a cooperating shell adapted to be driven into the earth by the core structure and means for effectively and inexpensively coupling adjacent sections of the shell which is built up of different lengths corresponding to the core and is arranged to be driven into the earth by the core. After driving, the core is retracted and the shell is filled with concrete.

A further object is to provide means for coupling together adjacent shell sections for relative movement and misalignment without rendering the shell joint susceptible to leakage. This is advantageously provided by a coupling ring which includes an annular sleeve which is radially engaged by an adjacent portion of a shell section.

A further object is the provision of a coupling between adjacent shell sections which is self-locking during the driving of the shell sections into the earth.

A further object is to provide means adapted to be applied in the field when the parts are partially assembled to firmly lock the shell sections together by cold forming a bead onto the inner surface of the upper shell section to lock the shell section onto the coupling ring to which the next lower section of the shell is attached.

Another object is to provide a coupling ring having an annular slot filled with resilient material and providing means for cold forming an annular bead into the shell section so that it will project into the annular slot in the coupling ring and squeeze the resilient material to seal the joint.

Another object is to provide a simple and effective method of locking the adjacent sections of a shell for cast-in-place concrete piles against relative longitudinal movement, which involves the cold forming of a bead into at least one of two telescoping members after the members are assembled at the site.

Another object is to provide a modified arrangement in which the lower shell section is provided with a bead which cooperates with an elongated groove in the ring extension within the shell.

Another object is to provide for preformed grooves and beads in the shell sections and in the coupling rings which are adapted to permit the parts to be forced together, relying on the flexibility of the parts.

A further object of the invention is to provide a telescoping shell arrangement which leads to a nest of shells particularly adapted for use in the formation of a relatively long cast-in-place pile.

With respect to telescoping shells for cast-in-place pile arrangements, such arrangements have found limited use in the past. Typically, the telescoping shell arrangements are employed to permit the removal of the shells concurrently with the pouring of concrete. Telescoping shell arrangements have also been employed in the digging of a hole for a pile, wherein the telescoping shell sections are interconnected so that when each shell section is extended, it catches the next section and pulls it along therewith. A disadvantage with this type of arrangement is that each shell section experiences the entire frictional force developed between the earth and that section and all those sections thereabove. As a result, during driving, shell sections are often driven apart from each other, completely destroying the telescoping arrangement, and this is especially the case with the point or bottom section which experiences the total load of the entire shell arrangement.

In the present invention, a telescoping shell arrangement is employed wherein each shell section is independently driven by a stepped core or mandrel. Different shoulders on the core drive different sections of the telescoping shell, and unique driving rings are employed for this purpose. Particularly, the bottom portion of each telescoping shell section is coupled to a driving ring, and all of the rings are of sufficient circumferential sizes to permit the telescoping of the shell sections. Each driving ring is contacted by a corresponding shoulder on the stepped core so that each shell section in turn is effectively pulled downwardly as the shell arrangement is driven into the ground.

Advantageously, the bottom of each shell section is welded, or rigidly coupled, to its associated driving ring. Additionally, the driving ring is adapted to frictionally engage the top portion only of the adjacent or inner shell which is surrounded by the ring. In this fashion, when adjacent shell sections are extended, a tight fit is provided between the extended inner shell section and the driving ring by the elasticity of the mating parts. Such a tight fit may be advantageously provided by a sleeve which forms a portion of the driving ring and which is contacted by an enlargement provided on the top portion of the inner shell which is normally initially of larger diameter than the sleeve. The sleeve is of sufficient length to permit upward and downward movement of the enlargement thereagainst, thereby to allow relative movement between adjacent shell sections without destroying the tight fitting engagement between the sleeve and the shell enlargement. Further, the sleeve may be cut away at the top portion thereof to provide a space between the sleeve and the inner shell into which the enlargement enters when it engages the surface of the sleeve. The lower surface of the space, providing a ledge section, when contacted by the enlargement provides a very large restraining force to prevent the shell end from passing by the sleeve altogether and effectively prevents the separation of adjacent shell sections. This lower ledge section of the sleeve has a diameter slightly larger than the outside diameter of the inner shell section so that the shell can slide freely through the ring for telescoping over most of the shell's length.

An important object of the invention hence is to provide an improved shell arrangement for a cast-in-place concrete pile.

The above and other objects of the invention will be more completely understood by reference to the following detailed description, which includes the appended drawings.

Referring to the drawings.

Figure 1:
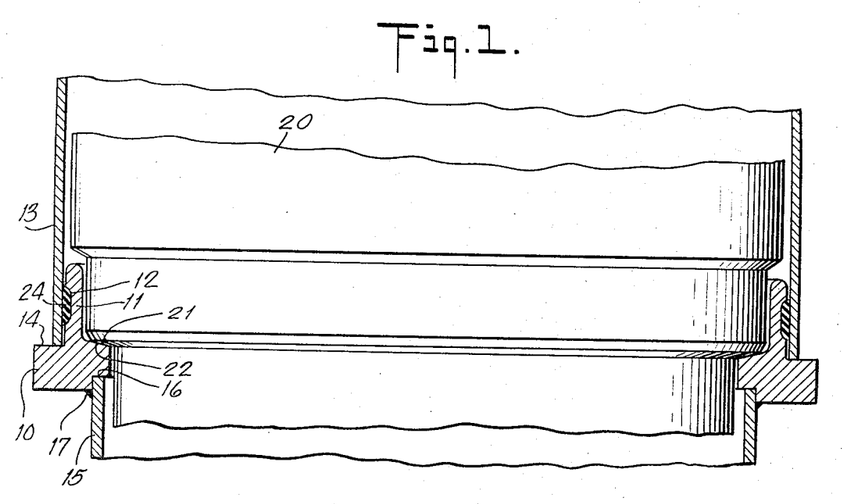
FIG. 1 is a partially sectional elevation of a shell coupling, which may be assembled at the site, without the formation of a locking bead.
Figures 2, 3, 6:
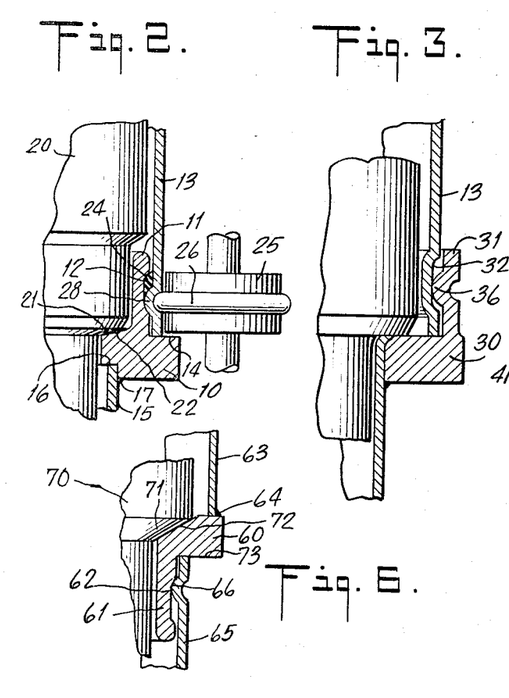
FIG. 2 corresponds to FIG. 1 but shows a roller as one of many possible tools for cold forming a bead into the upper shell section near the bottom whereby the section is locked into the groove of the coupling ring.
FIG. 3 shows an alternative arrangement of parts in which the shell extends within an annular sleeve of the coupling ring and in which a bead is formed in such annular sleeve.
FIG. 6 is another modification which has a coupling arrangement between the lower shell section and the coupling ring similar to that shown in FIG. 3 for the upper shell section.

Referring specifically to FIGS. 1 and 2, a coupling ring 10 has a sleeve 11 provided with annular groove 12 on the outer surface thereof. A section 13 of a shell forming a part of a casing for a cast-in-place concrete pile has a telescoping fit with the sleeve 11 and contacts a ledge surface 14 of the ring 10. The next lower section 15 fits under an internal ledge 16 of the ring 10 and is welded to the ring as indicated at 17. The driving core 20 has a driving surface 21 which cooperates with the surface 22 of the ring 10. When driving force is applied to the core 20, action is transmitted through the core surface 21 and the ring surface 22 and applied on the top of the lower shell section 15.

It will be understood that the core is arranged to drive on the top of the upper shell section 13 so that the shell and accompanying ring will move downwardly at the same time.

A plastic substance or sealant material such as rubber may be placed or inserted in groove 12 as indicated at 24.

When the parts are assembled, as shown in FIG. 1, a bead is formed in the upper shell section 13. As indicated in FIG. 2, one method of accomplishing this is by the application of a rolling tool 25 having a central annular projection 26 by forcibly pressing the roller 25 against the outer surface of the shell section 13. The shell section is cold rolled into the form shown in FIG. 2 with a bead 28 formed therein which is forced into the groove 12 of the sleeve 11. Thus the rubber or other plastic material 24 is squeezed to form a tight joint between the parts 11 and 13, and more importantly the bead 28 extends into the groove 12 and constitutes a lock between these parts, due to the ledges on either end of the groove, which prevents any substantial axial movement between them, except for such limited movement as may be provided by the fact that the groove 12 is longer in axial direction than bead 28.

It is apparent that after the complete shell arrangement has been driven into the earth, the shells act as columns and can support a substantial weight placed on the top of the shells. This is provided by the ledge 16 of the driving ring 10 which overlaps the upper end of the shell section 15 to permit a downward force to be transmitted through the ring 10 to the shell section 15, while upper shell 13 bears directly on the top of driving ring 10.

Referring to FIG. 3, a driving or coupling ring 30, which corresponds to ring 11 of FIGS. 1 and 2, has sleeve 31, which has a sufficient diameter to permit the upper shell section 13 to telescopically fit inside the sleeve instead of fitting on the outside of the sleeve as in FIGS. 1 and 2. In this arrangement the shell section 13 has an elongated groove 32 formed in its outer surface, and the sleeve 31 is preferably formed at the site by the application of the rolling tool 25 so as to form bead 36 which fits into the groove 32 and locks the parts against axial movement, except such as is provided for by the length of the slot 32. It should be understood that other suitable forming tool or tool means may be substituted for the rolling tool 25.

Figure 4:
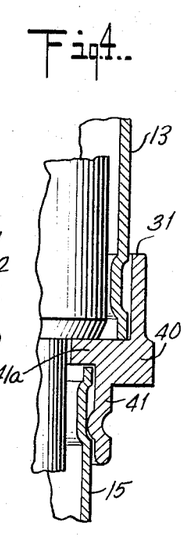
FIG. 4 shows the coupling ring provided with two annular projections with the upper shell section and the adjacent lower shell section telescoping into the sleeves.

In FIG. 4 the parts correspond to FIG. 3 except that sleeve 31 has not yet had bead 36 formed therein. However, the ring 40 has a downwardly extending sleeve 41 which forms the same locking connection with the lower shell section 15 as sleeve 31 of FIG. 3 has with the upper shell section 13. The ring 40 includes a ledge 41a that overlaps the upper end of the lower shell 15. The lower end of the upper shell 13 rests directly on the upper surface of ring 40. Thus the connected shells can support weight applied at the top of the entire structure as a column.

Figure 5:
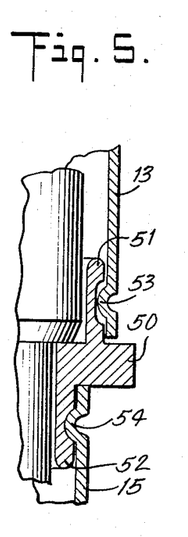
FIG. 5 is another alternative in which the locking arrangement of FIG. 2 is utilized for both the upper and the next adjacent lower shell sections.

FIG. 5 has a ring 50 which has an upwardly extending sleeve 51 and a downwardly extending sleeve 52. The shell sections 13 and 15 telescopically fit over sleeves 51 and 52, respectively, and beads 53 and 54 are formed in the adjacent ends of the shell sections.

Referring specifically to FIG. 6, a coupling ring 60 has an annular sleeve extension 61 provided with an annular groove 62. The upper shell section 63 rests upon the body of the ring 60 and is welded to it as indicated at 64. The lower shell section 65 has a bead 66 formed therein which cooperates with the annular groove 62 and prevents longitudinal separation of the parts, although a small longitudinal movement is permitted because of the length of the groove 62. A core 70 has a beveled surface 71 which cooperates with the corresponding beveled surface 72 of the ring 60. Driving force is applied in the usual manner by the core 70 and drives ring 60, carrying with it upper shell 63 due to its being rigidly attached to ring 60 by weld 64. Downward force may also be applied to the upper end of the shell section 65, particularly when the pile shells themselves are to bear part of the pile loading.

Figure 7:
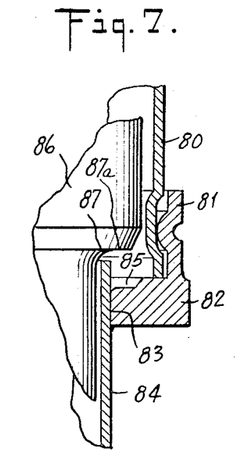
FIG. 7 corresponds to FIG. 3 but shows the upper end of the lower shell section prior to being upset as the parts are assembled.
Figure 8:
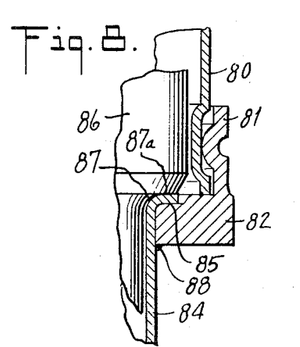
FIG. 8 shows the structure of FIG. 7 with the upper edge of the lower shell section swaged over a bevel in the coupling ring sufficient to hold the parts together without welding, although welding may be added.

Referring to FIGS. 7 and 8, in this arrangement the upper shell section 80 fits into the sleeve 81 of the coupling ring 82. This ring has a cylindrical hole 83 into which the next lower shell section 84 extends preferably with a close fit between the parts. Ring 82 has a beveled surface 85, and the core has a curved surface or fillet 87. When the parts are assembled as shown in FIG. 7 and the core 86 is forced downwardly in the pile driving operation, the fillet 87 first flares the top of the shell outward and then the shoulder 87a impinges upon the top of the lower shell section 84, which is thus subjected to a swaging action spreading the top of the shell section 84 and bending it down onto or beyond the bevel 85 as shown in FIG. 8.

In this way the shell section 84 is attached to the ring 82, and while the section 84 may be welded to the ring 82 as shown at 88, this welding may be omitted as it is usually unnecessary. When welding is omitted, it will be noted that the lower shell section 84 is free to telescope through the coupling ring 82 and through the upper shell section 80 for the length of the lower shell section when the core 86 is removed. Thus, the shells 80 and 84 may form a telescoped nest of shells of the type shown in FIG. 14 to be described in detail later. It will be understood by those skilled in the art that the weight of core 86 is very great and that the force with which it strikes the end of the shell 84 is quite sufficient to expand, enlarge and bend over the edge of the section substantially as illustrated.

Figure 9:
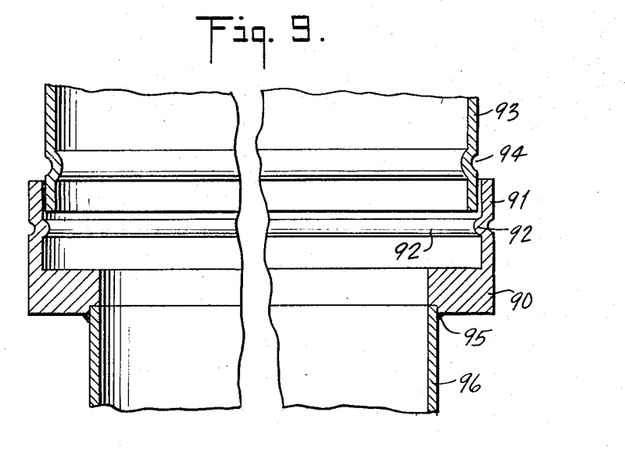
FIG. 9 corresponds to FIG. 1, but the structural arrangement of the upper shell and the coupling ring is like that of FIG. 3. The parts are ready to be forced together relying on the resiliency of the structure, made preferably of steel or some other suitable material, to permit the bead on the coupling ring to enter the groove in the lower end of the upper shell and thus hold the parts in position as shown in FIG. 10.
Figure 10:
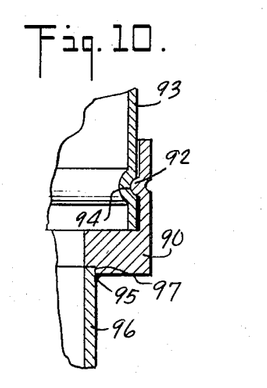

Referring to FIGS. 9 and 10, a coupling ring 90 has an annular sleeve 91 into which an internal annular bead 92 has been formed prior to assembling. The upper shell section 93 has a corresponding groove 94 preformed therein, and in this case the ring 90 is shown as welded at 95 to the top of the lower shell section 96.

In FIG. 9 the parts are ready to be assembled by forcing the parts together so that they will be in the position shown in FIG. 10. This may be accomplished, when the parts are in a horizontal position, by means of a jacking or pressing method prior to contacting the shell with the core, or the parts may be assembled as shown in FIG. 9, in vertical position and then forced together by introducing the core. To accomplish this assembling, the resiliency of the shell 93 and of the sleeve 91 is relied upon to permit the parts to be sprung sufficiently to allow the lower end of the shell section 93 to pass the bead 92 on the sleeve 91, the result being that the bead 92 enters the groove 94, and the parts are thus strongly held in position against axial movement. When the parts are thus assembled, they are very strongly held together so that they cannot be pulled apart without exerting a pulling force substantially equal to the pushing force necessary to get them together.

It will be observed that the ring 90 has an annular notch 97 into which the upper end of the lower shell 96 fits, the parts being welded at 95 as already explained. When the core, not shown, presses down on the ring 90, the lower shell section 96 is forced downwardly in the usual manner.

Figure 11:
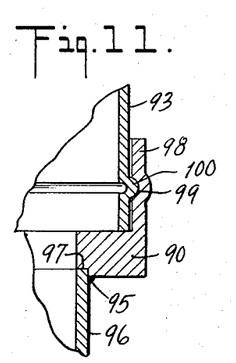
FIG. 11 differs from FIG. 10 in that the bead is formed on the outside of the shell and enters the groove in the coupling ring.

Referring to FIG. 11, the structure here shown corresponds to FIG. 10, and like parts have the same reference characters. However, the coupling ring 90 in this case has a sleeve 98 provided with an internal annular groove 99, and the upper shell section 93 has an external annular bead 100 which cooperates with the groove 99. The parts shown in FIG. 11 are preferably assembled in the same manner as described in connection with FIGS. 9 and 10.

Figure 12:
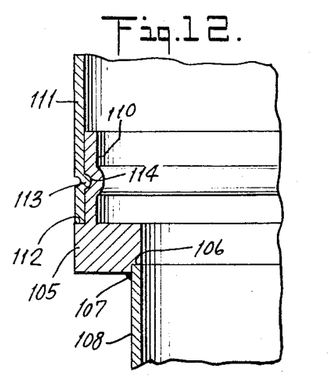
FIG. 12 corresponds to the structure of FIG. 9 except that the shell section has a bead formed within it and cooperates with a groove in the coupling ring sleeve which extends within it.

Referring to FIG. 12, the ring 105, which is notched at 106 and is welded at 107 to a lower shell section 108, has an upwardly extending sleeve 110 which is designed to have the upper shell section 111 fitted over it and abutting on surface 112 of the ring. In this case the shell section 111 has an annular internal bead 113 which fits into an exterior annular groove 114 of the sleeve 110.

Figure 13:
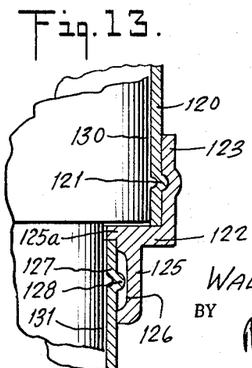
FIG. 13 shows a modified structure which is adapted to be assembled by forcing the parts together as those of FIGS. 9, 10, 11 and 12 and in which the preformed beads in the upper and lower shell sections project outwardly, thus enabling the core to be closely fitted within these parts as shown. One of the grooves in the coupling ring is elongated.

Referring to FIG. 13, upper shell section 120 has an outwardly extending bead 121 formed therein near its lower end, and coupling ring 122 has a sleeve 123 into which the shell section 120 is forced as hereinbefore described. The ring also has a downwardly extending sleeve 125 which has an elongated groove 126 and a lower shell section 127 has a bead 128 formed therein near its upper end. When the parts are forced together, the bead 128 enters the groove 126, the parts thus being held together but with provision for a limited axial movement between shell section 127 and sleeve 125 because of the length of the slot 126 and overhanging ledge 125a. The coupling arrangement of this figure is similar to that of FIG. 4, and thus the shells can act as a column supporting weight at the top thereof.

The core fits closely into the shell sections 120 and 127 and has an upper larger diameter portion 130 and a lower smaller diameter portion 131. The structures shown in FIGS. 9 to 13, inclusive, are adapted to be assembled by relying on the resiliency of the parts as above described.

In the several figures just described, there have been shown beads and grooves fitted closely in some cases and in others with the grooves elongated. Furthermore, the beads are sometimes projecting outward of the shell to cooperate with corresponding grooves in the collar sleeve. It should be understood that the parts may be reversed and other variants may be employed without departing from the spirit of this invention.

Figure 14:
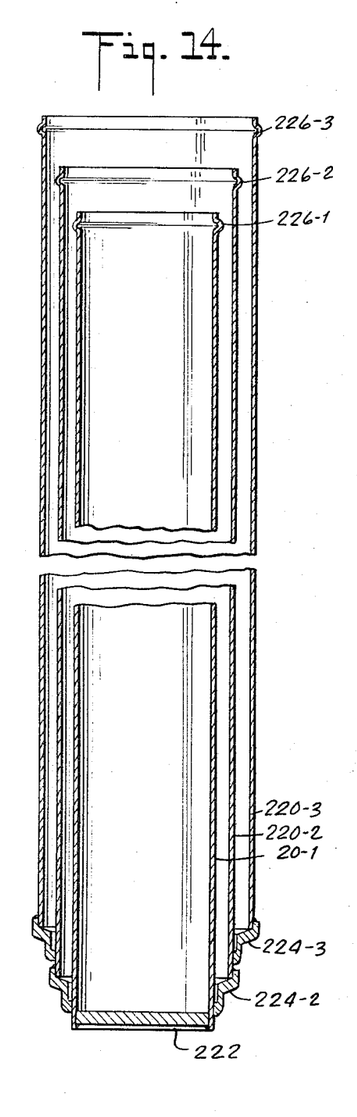
FIG. 14 is a sectional view of a telescoping nest of shells in accordance with the invention.

Referring to FIG. 14, three telescoping shell sections 220–1, 220–2 and 220–3 are shown. Each of the shell sections is cylindrical, although this is merely representative. The telescoping shells 220 are typically formed from relatively thin steel, although other suitable material may be used, and hence are adapted to be driven so that each section is pulled from its bottom end. For this purpose, the inner section 220–1 is provided with a bottom plate 222, while the shells 220–2 and 220–3 have driving rings 224–2 and 224–3, respectively, coupled to the bottom portions thereof. The driving rings 224–2 and 224–3 are of different circumferential dimensions sufficient to enable the shell 220–1 to telescope within the driving ring 224–2 and the shell 220–2 to telescope within the driving ring 224–3. While only three different telescoping diameters are shown, the same arrangement can be used for any number of shells as desired.

The shell sections 220 are formed with enlargements 226–1, 226–2 and 226–3 at the top portions thereof. These enlargements are adapted to be engaged by the driving ring of the adjacent outside shell, as will be described in more detail later. The enlargements 226 may be formed or made in any manner.

Figure 15:
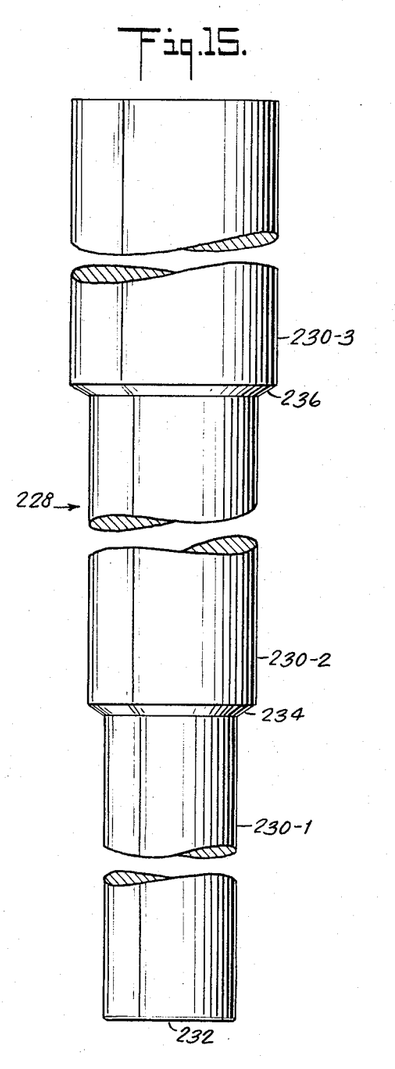
FIG. 15 is an elevation of a core or mandrel used to drive the telescoping shell arrangement of FIG. 14.
Figure 16:
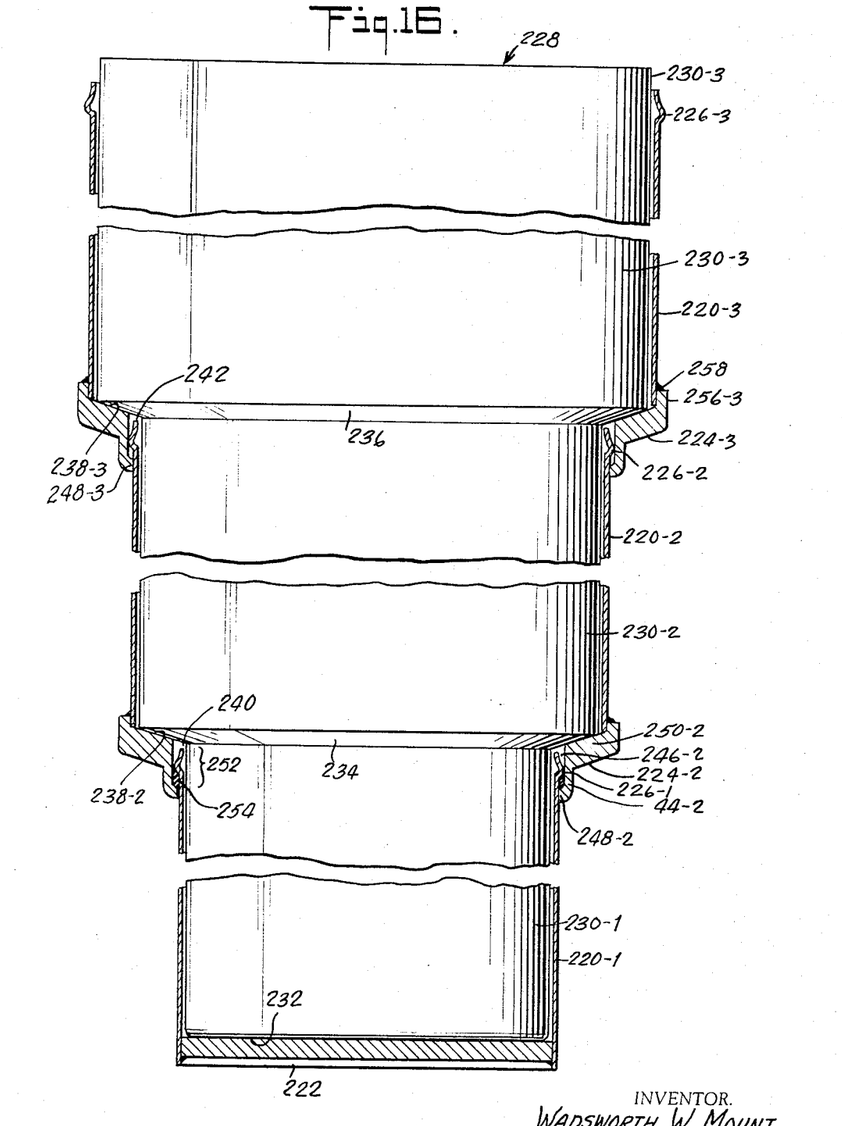
FIG. 16 is an elevation of the core of FIG. 15 driving the telescoping shell arrangement of FIG. 14.

FIG. 15 shows a core or mandrel 228 used to drive the telescoping shell arrangement shown in FIG. 14. The core 228 is formed from three sections 230–1, 230–2 and 230–3 of diameters that fit within the shell sections 220–1, 220–2 and 220–3, respectively. The core 228 has a bottom face 232 which engages the bottom plate 222 attached to the bottom of the shell section 220–1, as shown in FIG. 16. A tapered or flat shoulder 234 joins the core portions 230–1 and 230–2 and is adapted to contact the driving ring 224–2, as shown in FIG. 16, to pull the shell section 220–2 downwardly. Similarly, a shoulder 236 connects the core portions 230–2 and 230–3 and contacts the driving ring 224–3 to pull the shell section 220–3 downwardly.

It will be noted from FIG. 16 that the length of the core portion 230–1 is sufficiently great so that, when the shoulder 234 contacts a corresponding shoulder 238–2 on the driving ring 224–2, a small space 240 is left between the top of the shell section 220–1 and the shoulder 234 of the core. Similarly, the core section 230–2 is sufficiently long so that, when the core shoulder 236 contacts a corresponding shoulder 238–3 on the driving ring 224–3, a small space 242 is left between the top of the shell section 220–2 and the core shoulder. This provides room for breathing or stretching of the shells during driving or for slight discrepancies in shell lengths. In this fashion, as the core 228 drives the telescoping shell arrangement, none of the shell sections 220 experiences a downward force applied to the top of the shell section, at least at the start of driving. Hence the shell sections are pulled downwardly by the driving forces which are transmitted directly to the driving rings 224 and plate 222 on the bottom shell, and thus the shell sections 220 may be made of extremely thin gauge material which is placed only under tension when driven. Further, each shell section 220 is independently driven, and no shell section is employed to pull downwardly any other shell section. Thus the tension experienced by any shell section is merely the frictional force experienced by that shell section when the shell is driven into the earth.

The driving rings 224 are adapted to engage the enlargements 226 at the top portions of the shell sections 220. Driving ring 224-2 is representative and will be described in detail. The ring 224-2 includes a downwardly extending sleeve 244-2. The sleeve may be considered to be cut away to provide a space 246-2 terminated at its lower portion by the bottom portion 248-2 of the sleeve which provides a ledge. The shell section 220-1, except for the enlargement 226-1, easily slides by the sleeve bottom portion 248-2 so that the shell section telescopes within the driving ring. When, however, the core portion 230-1 pulls the shell section 220-1 downwardly so that the enlargement 226-1 commences to enter the space 246-2, the enlargement bears against the flat vertical surface of the sleeve, experiencing a large frictional engagement therewith, due to the diameter of the enlargement being initially greater than the inside diameter of the sleeve. The relatively thick body portion 250-2 of the driving ring renders the driving ring relatively rigid, and hence a force resisting downward movement of the shell section 220-1 is experienced according to the interference tolerances provided. The tolerances normally provide an interference fit which will permit a strong radial frictional grip without exceeding the elastic limits of the mating parts. When the frictional force against the shell section 220-2, first effected through pressure against ring 224-2 provided by the earth surrounding that shell section, is greater than the force between the enlargement 226-1 and the sleeve surface, the ring 224-2 is held still and the enlargement enters the space 246-2.

The enlargement 226-1 may assume the position shown in FIG. 16, for example, when the core shoulder 234 contacts the driving ring shoulder 238-2. It will be noted that the space 246-2 is of relatively large extent, as indicated by the bracket designated 252 in FIG. 16. Hence the enlargement 226-1 is susceptible to upward and downward movement and axial misalignment within the space while still engaging the driving ring in an extremely tight fit, due to the elasticity of the material. The tight fit provides a seal between the driving ring and the shell section to prevent water or other deleterious material or substance from entering into the telescoping shell arrangement. Hence, during driving and when the shell arrangement is completely driven, the joints between the shells are effectively sealed from water leakage, so that concrete may be poured any time thereafter without water removal. A sealing material, grease for example, may be provided on the inner surface of each of the sleeves 244 of the driving rings 224 and around the enlargements 226, to provide a seal 254 such as shown in FIG. 16 to aid in the prevention of water leakage into the shell.

Thus by this arrangement the joint between the top of a shell section and a surrounding driving ring is automatically locked against leakage by downward pressure of the driving mandrel and opposing upward pressure of earth resistance which forces the mating parts of the driving ring and shell into tight radial engagement.

The lower portion or ledge 248 of each of the driving rings 224 shown in FIGS. 14 and 16 positively engages the enlargement 226 at the top of the next inner shell section 220 in the event that the shell section moves sufficiently downwardly. The added force required to permit the enlargement 226 to pass by the ledge 248 is sufficiently great so as to permit the shell sections to be raised in extended position prior to the placing of the core 228 therein without the inner sections slipping completely past the driving rings of the outer shells, if desired. However, it is most usual to drive each shell progressively out of a nest of telescoping shells resting on the ground. This added force is also useful when the shell is required to resist an upward pull as part of a completed pile.

In the event that the shell sections 220 do telescope past the rings, however, it has been found that they may be used again and that there is no substantial deformity of the enlargements 226. Further, it has been found that if an additional shell section must be added in the field, it is a relatively simple matter to force the driving ring of the additional next larger diameter section downwardly over the enlargement 226 on the last section. Any number of additional shell sections may be added in this manner.

Figure 19:
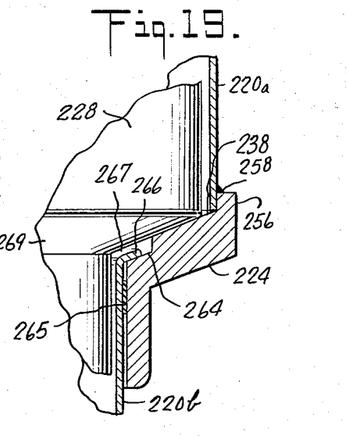

As has been noted, the top portions of the shell sections 220 are formed with enlargements to provide an external increased diameter. Each enlargement may take the form of a bead, as shown in FIGS. 14 and 16, near the end of the corresponding shell section. The enlargement may also take the form of a flared end of the shell section as shown in FIG. 19, as well as other forms. The upper ends of the shell sections 220 may be bent inwardly, as shown in FIG. 16, or directed vertically, as shown in FIG. 14, or the ends may be flared outwardly beyond the bead (not shown). Extending the ends of the shell sections inwardly, between the bead and the end of the shell, facilitates the addition of additional shell sections in the field, if required, by providing a tapered lead.

In order to keep the length of the sleeve 244 of the driving ring 224 short so that it will be economical to manufacture, it is essential that a bead or enlargement 226 of sufficient height and small radius be formed into the end of the shell section not more than roughly one inch away from the upper end of the shell section. By way of illustration, tests have shown that a bead of sufficient height (from $\frac{1}{64}''$ to $\frac{1}{8}''$) can be integrally formed on the upper end of the shell section of a thin-walled steel shell pipe within one inch of the end of the shell, and of so small a radius (from $\frac{1}{32}''$ to $\frac{1}{4}''$) that the mating sleeve of the driving ring can be short and thus economical to make and use. It should be understood that the specific materials and dimensions are given by way of examples and do not impose any limitations on the invention disclosed. Such a small radius bead formed in this manner has very great structural arch strength to withstand heavy axial and radial pressures. Normally the shell sections 220 are fixedly attached at their lower ends to the associated driving rings 224 by welding, for example. In FIG. 16, taking the driving ring 224-3 as representative, the ring is formed with an upwardly extending sleeve 256-3 on the inside of which is positioned the shell section 220-3. A weld 258 secures the shell section 220-3 to the sleeve 256-3.

Figure 17:
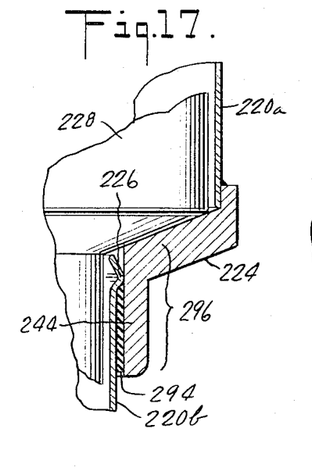
FIGS. 17, 18, 19, 20 and 21 are sectional views of different driving ring and shell arrangements each suitable for a telescoping nest of shells in accordance with the invention.

FIG. 17 shows an alternative arrangement for the driving ring 224. In this case, the sleeve 244 does not contain a lower ledge such as 248 shown in FIGS. 14 and 16, thereby allowing the enlargement 226 on shell section 220b to enter or leave the ring 224 from above or below the ring. This facilitates adding extra shell sections in the field where the pile shells are not required to withstand a vertical lifting force before or after the shells are driven. The frictional engagement in a radial direction between the enlargement 226 on the shell section 220b and the sleeve 244 is sufficient to provide the sealing referred to above. A sealing material may be provided on the edges of the sleeve if desired, to form a seal such as shown at 294. Furthermore, earth jamming between the shell and the sleeve during driving further assists the sealing of the joint. The length of the sleeve 244, designated as 296 in FIG. 17, is sufficient to provide adequate movement of the lower shell section 220b while retaining the engagement between the enlargement 226 and the sleeve, permitting relative movement between the shell section and the sleeve during driving.

Figure 18:
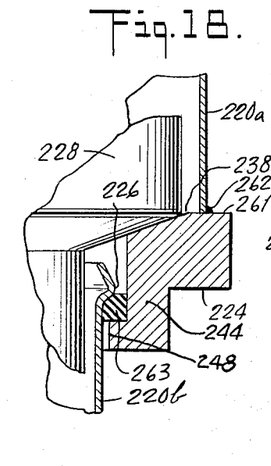

FIG. 18 shows another modified form of driving ring 224. The upper shell section 220a is supported on a shoulder 261 of the ring and welded thereto as at 262. The lower shell section 220b is formed with an enlargement 226 at the upper end thereof. However, in this case, the inside diameter of the sleeve 244 of the driving ring is sufficiently greater than the outside diameter of the enlargement 226 so that there is no tight contact between the enlargement and the sleeve above the ledge 248. As the shell section 220b is driven downwardly by the core 228 to the position shown in FIG. 18, the enlargement 226 compresses a sealing material 263 between ledge 248 and enlargement 226 to form an effective seal between the shell section 220b and the driving ring 224 to prevent leakage into the shell arrangement.

FIG. 19 shows a modified form of driving ring 224 similar to the ring 82 of FIGS. 7 and 8. In this case, however, the upper shell section 220a is welded to the upwardly extending sleeve 256 on the ring, as at 258. The shoulder 238 of the driving ring is formed with a notch 264 to receive the top portion 266 of the lower shell section 220b. Like the arrangements of FIGS. 7 and 8, the top portion 266 is not preformed with an enlargement but is adapted to be bent over into the notch 264 by the core or mandrel 228, due to its extra length. The notch 264, however, is of the same depth or deeper than the thickness of the casing forming the shell section 220b, so that a space 267 exists, or will be created by driving forces, between the top portion 266 of the shell and the driving shoulder 269 of the mandrel. In this fashion, the shoulder 269 of the core bends the top portion of the shell 220b over, in a fashion similar to that shown in FIGS. 7 and 8, but once the shell section is bent the core directly drives the driving ring 224 by impinging against the driving ring shoulder 238. Following the bending of the shell 220b, then, the top portion 266 of the shell may move within the notch 264 in the driving ring to account for movement of the shell section 220b to its proper position during the driving of the entire shell arrangement into the earth. Sealing material, designated 265, may be placed anywhere between shell 220b and ring 224.

Figure 20:
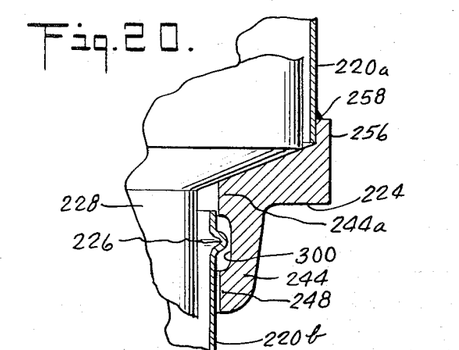

FIG. 20 shows a modified form of driving ring 224 suitable for providing a telescoping nest of shells and incorporating shell-to-ring coupling features similar to those shown in FIG. 13. except in this form the ring does not overlap the top end of the lower shell 220b. Upper shell section 220a is welded to sleeve 256 of the driving ring as at 258. Sleeve 244 includes an annular elongated groove 300 therein, into which is positioned enlargement 226 on lower shell section 220b during driving. The enlargement or bead 226 is thus snapped into the annular elongated groove 300 by the core 228 when it pulls the shell 220b downwardly. Once the bead is snapped into the groove, the bead is free to move within the groove to compensate for slight upward and downward movement of the shell 220b with respect to the ring 224 as well as axial misalignment of the lower shell section with respect to the ring.

It will be noted from FIG. 20 that the lower sleeve 244 is the same as the sleeve 125 of the driving ring shown in FIG. 13, with the exception that the overhanging ledge 125a of the driving ring 122 is omitted in the ring of FIG. 20. Hence the ring of FIG. 20 includes an upper ledge 244a which is of the same internal diameter as the lower edge 248. The arrangement of FIG. 20, then, provides a telescoping of the lower shell section 220b through the driving ring 224, which is not possible in the case of the lower shell 127 in FIG. 13. Thus the bead 226 of the lower shell may be snapped into the groove 300 from above or below ring 224. The snap-in arrangement of FIG. 20 provided by the elongated groove 300 as limited by the ledges 244 and 248 is thus a logical progression, to permit telescoping, from the snap-in arrangement of FIG. 13 which does not permit telescoping.

The ledge 244a in FIG. 20 together with the lower ledge 248 provides suitable limits on the elongated annular groove 300 to bind sealing material in the groove closely around the enlargement 226 on the lower shell section 220b to aid in the sealing of the joint by the shell section and driving ring. Since substantial force is required to snap the enlargement 226 over either ledge 244a or 248 once the bead is snapped into groove 300, the string of connected shells may be hung from the top or supported at the bottom without separating. It will be noted, however, that if this snap-in arrangement is not deemed necessary, the next logical progression in the arrangement is to omit the upper ledge 244a, which leads to the driving ring structure shown in FIGS. 14 and 16.

The next logical progression is to omit the bottom ledge 248 of the driving ring, and this is what is shown in FIG. 17. In this case, the telescoping shell 226 of that figure is also free to enter the driving ring from either above or below the ring.

Figure 21:
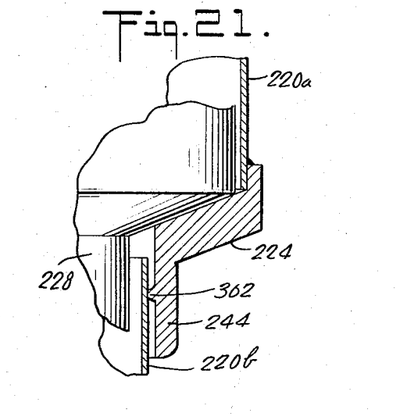

FIG. 21 shows still a further modification of the driving ring 224. In this case, the downwardly extending sleeve 244 includes an annular enlargement or projection 302 thereon which may or may not be integral with the sleeve. The enlargement engages, preferably with an interference fit, the lower shell section 220b. In this case, the end of the lower shell 220b need not be formed in any manner; however, it may be flared slightly in either direction if desired. The arrangement shown in FIG. 21 is particularly suitable for the addition of the shell section 220b from either above or below the driving ring 224.

Figure 22:
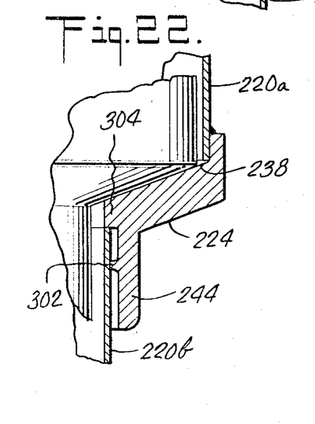
FIGS. 22 and 23 are sectional views of different driving ring and shell arrangements in accordance with the invention and incorporating radial engagement between a shell section and a driving ring.

FIG. 22 shows still another modified form of driving ring 224 which is similar to the driving ring shown in FIG. 21. The arrangement of FIG. 22 is not suitable for telescoping of the lower shell section 220b for its entire length through the driving ring 224. In particular, an inwardly extending upper ledge 304 joining the sleeve 244 and the driving surface 238 prevents upward movement of the upper end of the shell section 220b past the overlapping ledge. The projection 302 on the driving ring sleeve 244 radially engages the lower shell section 220b to cause a tight seal between the driving ring and the shell section.

Figure 23:
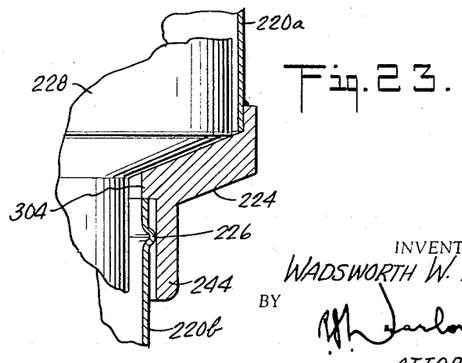

FIG. 23 shows a driving ring 224 similar to the driving ring shown in FIG. 22 and in effect incorporating a reversal of parts. Again, the lower shell section 220b is prevented from telescoping for its entire length through the driving ring by virtue of the inwardly extending upper ledge 304. A seal is formed between the shell section 220b and the sleeve 244 by the enlargement 226 at the top of the shell section which radially engages the sleeve. In FIGS. 22 and 23, the shells can support weight applied at the top, as a column.

It will be noted that the shells of the present invention will normally be shipped in a telescoped nest, where the shells are capable of telescoping as in FIG. 14 for example, and wherein the heavy driving rings protect the bottom ends of the shells and the beads or enlargements stiffen the upper ends of the shells. On the job, the entire nest of telescoped shells will normally be set upright over the point where the pile is to be driven. The stepped mandrel will first be inserted into the shell arrangement with the smallest diameter mandrel section positioned within the innermost and smallest diameter shell section. The progressively larger sections of the stepped mandrel become progressively positioned within the correspondingly larger diameter shell sections. It will be understood that by this arrangement, the mandrel is required to be hoisted only high enough to clear the top of nest of shells in order to be positioned for driving the shells. Where desired, the nest of shells may be extended and hauled up nearly full length on the mandrel to position all the mandrel sections within the corresponding shell sections in advance of driving the shell.

It will be noted that a unique telescoping shell arrangement for pile driving operations has been disclosed. The arrangement is such that the individual shell sections are independently driven and are pulled downwardly into the earth, thereby allowing relatively thin casings to be employed for the sections. Further, the telescoping aids in the positioning of a mandrel within the shell arrangement, alleviating problems normally encountered in hoisting relatively long shells. A unique driving ring arrangement has been provided, each coupled to the lower end of an associated shell section and of sufficient circumferential size to permit the free telescoping of the shells. The driving rings are adapted to engage the upper portion of the next inner shell section in the couse of driving automatically to provide a seal which is effective to prevent leakage both during and after driving of the telescoping shell arrangement into the ground. The rings further aid in the addition of extra shell sections in the field.

This telescoping arrangement eliminates the need for costly handling of the individual shell sections in the field prior to driving and the consequent damage thereto which often takes place. One of the main advantages of driving an economical and effective nest of telescoping shells, as is provided by the present invention, is that the shell at ground level does not have to support the entire momentum forces created by the weight of the shells that would be normally up above on the core when the shells are fastened together and are driven as a full-length string. With such a full-length string, especially a long one, the joints are often injured and their waterproofness destroyed, and at times the shells themselves are collapsed and distorted above ground by the inertial forces, particularly when the shells are corrugated.

The invention further provides a unique coupling arrangement for adjacent shell sections, whether or not the shell sections are fully telescoping, which permits relative movement between adjacent shell sections to account for movement during driving including axial misalignment and longitudinal stretching upward of the shells due to ground friction. A coupling or driving ring is incorporated which may, together with a shell section, incorporate a bead and elongated groove combination such that the bead on one of the members is snapped into the elongated groove in the other member to provide a locking coupling susceptible of the movement referred to. Additionally, the coupling may incorporate a sleeve on the driving ring which may be radially engaged by an enlargement on a shell section or which itself includes an enlargement to radially engage the shell section. In either case, the radial engagement between shell section and driving ring sleeve provides an effective seal between the members which is not destroyed with relative movement between the members.

The coupling arrangements disclosed are advantageous inasmuch as they provide effective seals which may be completed during the driving of the shell sections. In other words, the shell sections need not be completely coupled together before the driving of the shell arrangement into the ground.

It will be noted that various embodiments of the invention have been illustrated. It will be obvious that such embodiments are subject to modification which nonetheless fall within the spirit of the invention. Accordingly, the scope of the invention is defined by the following claims.

What is claimed is:

1. The method of forming a shell coupling to be driven by a mandrel to form a shell for a cast-in-place pile, which comprises assembling a nest of shell sections which are free to telescope one within another for at least a substantial portion of the length of each shell section, each shell section but not necessarily the innermost shell section including driving ring means at the bottom portion thereof having an annular sleeve through which the next inner shell section telescopes, the upper portion of each shell section when positioned adjacent the sleeve on the driving ring means of the next outer shell section radially engaging said sleeve, and applying downward forces by a stepped mandrel to the driving ring means to force the driving ring means downwardly into the earth and concomitantly to engage radially the top portion of each shell section with the sleeve of the driving ring means of each next outside shell section to effectively seal adjacent shell sections.

2. In a pile arrangement of nested shells to be driven by a mandrel, the combination comprising an outer tubular shell having driving ring means at the bottom portion thereof for receiving a driving force, and an inner tubular shell positioned within the driving ring means and of a lesser circumferential dimension than the outer shell so that the inner shell may telescope through the driving ring means and the outer shell for at least a substantial portion of the length of the inner shell, the driving ring means radially engaging the upper portion of the inner shell telescoped therein to provide a tight seal between the driving ring means and the upper portion of the inner shell.

3. A cast-in-place pile arrangement which is to be driven by a mandrel, the combination comprising an outer tubular shell, a driving ring coupled to the bottom portion of the outer shell and adapted to receive a driving force, and an inner tubular shell positioned within the driving ring and of a lesser circumferential dimension than the outer shell so that the inner shell may telescope through the driving ring and the outer shell for at least a substantial portion of the length of the inner shell, the driving ring including a sleeve which extends in the direction of the longitudinal axis of the inner shell, the inner shell including an enlargement in the upper portion thereof which radially engages the sleeve to provide a tight fit between the sleeve and the enlargement, said sleeve being of sufficient length to permit upward and downward movement of the enlargement thereagainst, thereby to allow upward and downward movement of the inner shell with respect to the outer shell without destroying the tight-fitting radial engagement between the sleeve and the enlargement.

4. A cast-in-place pile arrangement which is to be driven by a mandrel, the combination comprising an outer tubular shell, a driving ring coupled to the bottom portion of the outer shell and adapted to receive a driving force, and an inner tubular shell positioned within the driving ring and of a lesser circumferential dimension than the outer shell so that the inner shell may telescope through the driving ring and the outer shell for at least a substantial portion of the length of the inner shell, the driving ring including a sleeve which extends downwardly in the direction of the longitudinal axis of the inner shell and which terminates in an inwardly extending ledge, the inner shell including an enlargement in the upper portion thereof which radially engages the sleeve to provide a tight fit between the sleeve and the enlargement and which axially engages the ledge to prevent the passage of the inner shell completely through the driving ring.

5. In cast-in-place pile arrangement which is to be driven by a mandrel, the combination comprising outer and inner tubular shells of differing circumferential dimensions so that the inner shell telescopes within the outer shell for at least a substantial portion of its length, a driving ring coupled to the bottom portion of the outer shell and surrounding the inner shell to permit the telescoping of the inner shell therethrough, the driving ring having an upwardly exposed driving surface which extends inwardly toward the inner shell for a distance sufficiently far so that a corresponding shoulder on the mandrel may be positioned vertically thereover to transmit a downward force thereto, the upwardly exposed driving surface having a notch on its upper inside edge to receive the upper portion of the inner shell, and a mandrel having driving shoulders one of which engages the upper portion of said inner shell causing said upper portion to be bent over into said notch when said mandrel shoulder is tight against said upwardly exposed driving surface, said inner shell being slightly longer than the distance between the driving shoulders on the mandrel.

6. In a cast-in-place pile arrangement which is to be driven by a mandrel, the combination comprising outer and inner tubular shells of differing circumferential dimensions so that the inner shell telescopes within the outer shell for at least a substantial portion of its length, and a driving ring coupled to the bottom portion of the outer shell and surrounding the inner shell to permit the telescoping of the inner shell therethrough, the driving ring having a shoulder which extends inwardly toward the inner shell for a distance sufficiently far so that a corresponding shoulder on the mandrel may be positioned vertically thereover to transmit a downward force thereto, the driving ring including a sleeve which extends in the direction of the longitudinal axis of the inner shell, the inner shell including an enlargement in the upper portion thereof which engages the surface of the sleeve with an interference fit to provide a tight seal between the sleeve and the enlargement.

7. In a cast-in-place pile arrangement which is to be driven by a mandrel, the combination comprising an outer tubular shell, a driving ring coupled to the bottom portion of the outer shell and adapted to receive a driving force, and an inner tubular shell positioned within the driving ring and of a lesser circumferential dimension than the outer shell so that the inner shell may telescope through the driving ring and the outer shell for at least a substantial portion of the length of the inner shell, the driving ring including a sleeve which extends downwardly in the direction of the longitudinal axis of the inner shell and which includes an elongated annular groove therein, the inner shell including an enlargement in the upper portion thereof which enters into the groove in the sleeve to engage the sleeve while at the same time being permitted to move axially within the groove to compensate for any tolerances in the shell or misalignment without destroying the engagement between the enlargement and the sleeve.

8. A pile shell comprising a series of shell sections including a smaller bottom section with a closed bottom adapted to penetrate the earth and one or more successively larger upper sections, each upper section having driving ring means at its lower end, said driving ring means including an inside sleeve of lesser diameter than the diameter of the shell section thereabove, each shell section having an enlargement at its upper end which is initially of greater diameter than the inside diameter of the driving ring means into which the enlargement is forced when the pile is driven, the sizes of the driving ring means and shell sections being such as to provide for the telescoping of the sections, for substantially their entire lengths, said closed bottom and said driving ring means being adapted to be forced downwardly when the pile is driven by a stepped core whereby each shell section is pulled downwardly as force is successively applied to the closed bottom and then to the driving ring means on each upper section by the steps of the core.

9. A nest of two or more shells for pile driving telescoped over most of their length before being driven, a stepped driving mandrel, the shells having upwardly exposed driving surfaces on their bottom ends thereof cooperating with the bottom and stepped driving shoulders of the mandrel, the upwardly exposed driving surface of each shell above the bottom and innermost shell having a longitudinally extending surface on its inner diameter, and the length of each shell being such that its top edge lies opposite the longitudinal extending surface and below the upwardly extending driving surface of the shell next above when being driven by the mandrel so that no shell section can be driven from its top end.

10. A pile arrangement as defined in claim 9, wherein the upper section of each shell is in tight radial contact with the inner longitudinal sleeve on the lower end of the next shell thereabove when said each shell is being driven.

11. A nest of two or more shells for pile driving as defined in claim 9, wherein the longitudinally extending surface on the inner diameter of the upwardly exposed driving surface of each shell above the bottom and innermost shell is downwardly extending and terminates in an inwardly extending ledge.

12. A nest of two or more shells for pile driving as defined in claim 9, wherein the longitudinal extending surface on the inner diameter of the upwardly exposed driving surface of each shell above the bottom and innermost shell is downwardly extending and includes an inwardly extending annular bead in a mid portion of said longitudinally extending surface below the level of said driving surface.

13. A nest of two or more shells for pile driving as defined in claim 9, wherein the longitudinally extending surface on the inner diameter of the upwardly exposed driving surface of each shell above the bottom and innermost shell is downwardly extending and includes a radially shallow inwardly extending annular ledge on said longitudinally extending surface below the level of said driving surface.

14. A nest of two or more shells for pile driving as defined in claim 9, wherein the longitudinally extending surface on the inner diameter of the upwardly exposed driving surface of each shell above the bottom and innermost shell is downwardly extending and includes an annular groove therein.

15. A shell for a cast-in-place pile arrangement as defined in claim 14, wherein said annular groove is vertically elongated.

16. A cast-in-place pile arrangement, comprising a first tubular shell, first driving ring means at one end of the first tubular shell, the other end of the first tubular shell being deformed to provide an enlarged end portion of greater circumferential dimension than the circumferential dimension of the main portion of the shell, a second tubular shell, second driving ring means at one end of said second tubular shell, said second driving ring means including an inner longitudinal surface, said enlarged end portion of said first tubular shell engaging by an intereference fit said inner longitudinal surface of said second driving ring means, said interference fit being produced by the enlarged end portion of said first tubular shell being larger in diameter than said inner longitudinal surface prior to engagement of said enlarged end portion and said inner longitudinal surface.

17. A cast-in-place pile arrangement as defined in claim 16, wherein the longitudinal length of the enlarged end portion of the first shell is a very small fraction of the longitudinal length of the inner longitudinal surface of the driving ring means of the second tubular shell.

18. A cast-in-place pile arrangement as defined in claim 17, including a stepped mandrel for the driving ring means of the first and second tubular shells, and wherein the first shell section is slightly shorter than the distance between driving surfaces on the mandrel to provide for vertical reciprocating motion of the first shell relative to the driving ring means of the second shell without breaking the radial seal or driving on the upper edge of the first shell.

References Cited

UNITED STATES PATENTS

| | | | |
|---|---|---|---|
| 492,227 | 2/1893 | O'Neal | 94—34 |
| 975,487 | 11/1910 | Welsh | 61—53.7 |
| 1,249,850 | 12/1917 | Stewart | 61—53.64 |
| 1,460,787 | 7/1923 | Burch | 166—242 X |
| 1,836,140 | 12/1931 | Upson | 61—53.7 |
| 2,122,477 | 7/1938 | Leonard | 29—511 |
| 2,284,222 | 5/1942 | Miller | 29—453 |
| 2,305,375 | 12/1942 | Beasley et al. | 29—453 |
| 2,371,784 | 3/1945 | Titcomb et al. | 61—53.7 |
| 2,638,664 | 5/1953 | Maxson | 29—511 |
| 2,924,949 | 2/1960 | Smith | 61—53.7 X |
| 3,131,543 | 5/1964 | Dougherty | 61—53.5 |

FOREIGN PATENTS

| | | |
|---|---|---|
| 28,641 | 1903 | Great Britain. |
| 688,579 | 1953 | Great Britain. |

DAVID J. WILLIAMOWSKY, *Primary Examiner.*

JACOB SHAPIRO, *Assistant Examiner.*